United States Patent [19]

Ichikawa

[11] Patent Number: 5,025,243
[45] Date of Patent: Jun. 18, 1991

[54] INFRARED DETECTIVE ELEMENT

[75] Inventor: Hiroshi Ichikawa, Yokohama, Japan

[73] Assignees: Nippon Carbon Co., Ltd.; Sogo Security Services Co.; Hiroaki Yanagida, all of Tokyo, Japan

[21] Appl. No.: 417,477

[22] Filed: Oct. 5, 1989

[51] Int. Cl.$^5$ ............................................. H01L 31/08
[52] U.S. Cl. .................................. 338/18; 250/370.01; 250/338.4
[58] Field of Search ............. 250/338.4, 370.01, 338.1; 357/30 K, 30 Q; 338/18, 22 R, 15, 25

[56] References Cited

U.S. PATENT DOCUMENTS

| | | | |
|---|---|---|---|
| 3,707,695 | 12/1972 | Yamaka | 338/18 |
| 3,952,275 | 4/1976 | Ennulat et al. | 338/18 |
| 4,574,263 | 3/1986 | Liddiard | 338/18 |

Primary Examiner—Marvin M. Lateef
Attorney, Agent, or Firm—Bucknam and Archer

[57] ABSTRACT

An infrared detective element for detecting a dose of infrared rays by a change in electrical resistance of monofilaments composed mainly of silicon carbide upon infrared radiation thereto, either the monofilaments having a resistivity of $1.0 \times 10^5$ to $1.0 \times 10^3$ $\Omega$.cm at room temperature and a diameter of 3 to 200 $\mu$m, or the monofilaments having a composition:
  Si: 50 to 70 wt %
  C: 28 to 40 wt %
  O: 0 to 10 wt % the balance (H and/or Ti or Zr): 0 to 10 wt %, and having a resistivity of $1.0 \times 10^5$ to $1.0 \times 10^{-1}$ $\Omega$.cm at room temperature and a diameter of 3 to 200 $\mu$m, in either case, the monofilaments being arranged between electrodes without bringing them into contact with each other. The infrared detective elements of the present invention are excellent in properties, especially short response times.

2 Claims, 1 Drawing Sheet

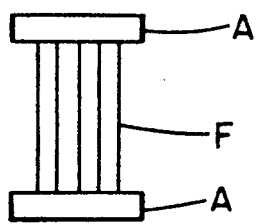
FIG.I(a)
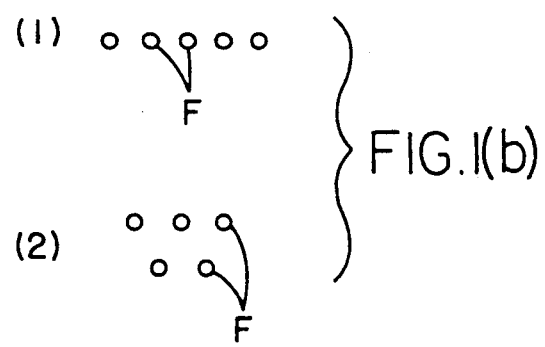
FIG.I(b)
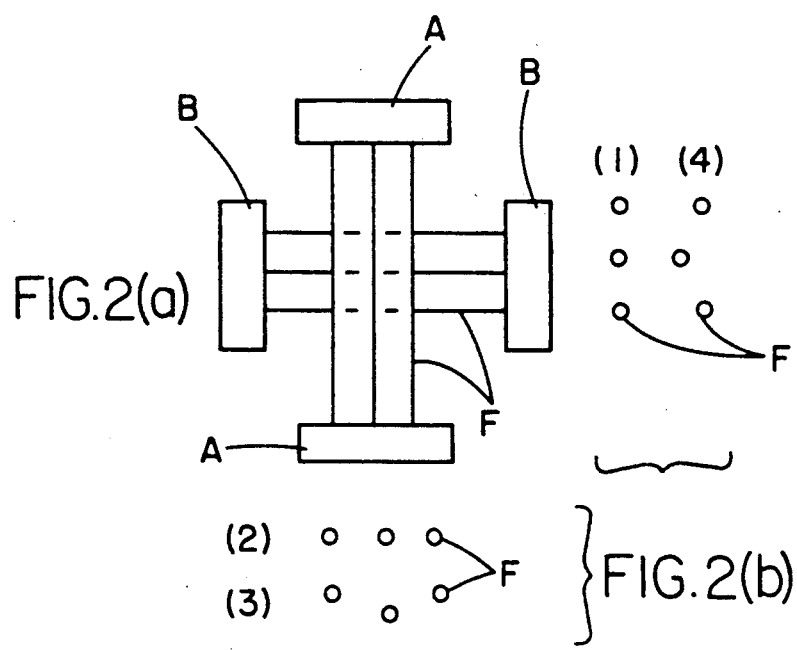
FIG.2(a)
FIG.2(b)

INFRARED DETECTIVE ELEMENT

BACKGROUND OF THE INVENTION

1. Field of the Invention

The present invention relates to an infrared detective element using semiconductor fibers to detect a dose of infrared rays by a change in electrical resistance due to a change in temperature upon infrared radiation.

2. Description of the Prior Art

Typical conventional infrared detective elements are a pyroelectric element using a pyroelectric effect and a thermopile obtained by stacking thermocouples. These infrared detective elements have the following characteristics: (a) they do not require cooling; (b) their sensitivity does not depend on wavelengths; and (c) they can be manufactured at a low cost as compared with other infrared detective elements. Therefore, the conventional infrared detective elements have been widely used.

However, such infrared detective elements have a somewhat long response time and are not suitable in applications requiring short response times. In addition, there are limitations in detection of an infrared source position. Furthermore, the conventional infrared detective elements are still rather expensive.

The present inventors proposed an infrared detective element using semiconductor fibers whose electric resistance is changed upon a change in temperature (Japanese Patent Application No. Sho 63-222506).

The above semiconductor fibers can be manufactured at a relatively low cost. Since the fibers are slender, they have a small heat capacity and can quickly respond to heat change. Therefore, the thus proposed infrared detective element using the semiconductor fibers can solve the above conventional problems.

Recently, however, strict demands have arisen for infrared detective functions in a variety of fields of infrared detective elements. In order to satisfy these demands, extensive researches and developments have been made on, particularly, a decrease in response time and an increase in sensitivity to temperature.

SUMMARY OF THE INVENTION

The present inventors had made continuous extensive studies of the infrared detective elements and found that the desired detective function and especially the response characteristics could be improved by using semiconductor fibers, i.e. fibers composed mainly of silicon carbide, having a specified resistivity, by specifying the composition of the fibers, and by arranging these fibers in a noncontact state, thereby achieving the present invention.

According to the present invention, there is provided an infrared detective element for detecting a dose of infrared rays by a change in electrical resistance of fibers composed mainly of silicon carbide upon infrared radiation.

According to one aspect of the present invention, there is provided an infrared detective element using therein monofilaments which are composed mainly of silicon carbide, have a resistivity of $1.0 \times 10^5$ to $1.0 \times 10^3$ $\Omega$.cm at room temperature and also have a monofilament diameter of 3 to 200 $\mu$m.

According to another aspect of the present invention, there is provided an infrared detective element using monofilaments which are composed mainly of silicon carbide, have a resistivity of $1.0 \times 10^5$ to $1.0 \times 10^{-1}$ $\Omega$.cm at room temperature and also have a monofilament diameter of 3 to 200 $\mu$m, the filaments having a composition of:

Si: 50 to 70 wt%
C: 28 to 40 wt%
O: 0 to 10 wt% and
the balance (H and/or Ti or Zr): 0 to 10 wt%.

The monofilaments in both the aspects are arranged between electrodes without bringing the monofilaments into contact with each other.

The silicon carbide monofilaments used in the present invention are obtained by melt extruding an organosilicon compound such as usually polycarbosilane, or a polymer compound obtained by adding an organometallic compound (e.g. titanium alkoxide or zirconium alkoxide) to polycarbosilane, making infusible (infusibilizing) the thus extruded material in an oxydizing atmosphere at 100° to 300° C., and then firing the thus infusibilized material in an inert atmosphere at 1,000° to 1,600° C., thereby obtaining the desired silicon carbide monofilaments having a diameter of 3 to 200 $\mu$m.

The composition of the thus obtained filaments is given as follows:

Si: 40 to 70 wt%
C: 20 to 40 wt%
O: 0 to 20 wt% and
the balance (H and/or Ti or Zr): 0 to 10 wt%.

The monofilaments may have different resistivities by the use of different firing temperatures in the firing step.

According to the test results of the present inventors, as will be apparent from embodiments to be described later, monofilaments having a resistivity of $1.0 \times 10^5$ to $1.0 \times 10^3$ $\Omega$.cm at room temperature are selected to obtain a larger decrease in resistivity upon infrared radiation, i.e. a higher thermistor constant, than that of a silicon carbide thin film. Infrared detective elements excellent in infrared detective characteristics, for example, a thermal time constant falling within a range of 10 to 50 msec, can be obtained. When the resistivity exceeds the above range, a current flowing through the detective element is too small to be detected. However, if the resistivity is below this range, the thermistor constant is too small thereby degrading the response characteristics.

According to the other findings of the present inventors, when the composition of the silicon carbide fibers is limited to the following values, the infrared detective element still has an excellent detective ability even if the lower limit of the resistivity value is decreased.

For example, if polycarbosilicane or a compound obtained by adding an organometallic compound to polycarbosilane is incorporated with an aromatic hydrocarbon (such as a pitch) and then polymerized, to increase the proportion of C, the resulting monofilaments may have the following composition:

Si: 50 to 70 wt%
C: 28 to 40 wt%
O: 0 to 10 wt% and
the balance (H and/or Ti or Zr): 0 to 10 wt%. The diameter of these monofilaments preferably fall within a range of 3 to 200 $\mu$m. These specific silicon carbide fibers may have a resistivity within a range of $1.0 \times 10^5$ to $1.0 \times 10^1$ $\Omega$.cm at room temperature for the purpose of the present invention.

These fibers exhibit excellent detective performances even in a low-resistivity range. When they have a diameter of 30 $\mu$m or less, they also exhibit a good heat dissipation property, thus providing more excellent detective performances.

In the arrangement of the fibers or monofilaments, when they are entangled or in contact with each other, they will have a decreased light-receiving area and a degraded heat dissipation property, thus causing the generation of noises.

The detailed arrangements of the fibers or monofilaments are illustrated in FIGS. 1(a) to 2(b).

FIG. 1(a) is a view showing a state wherein filaments F are extended between electrodes A. In this case, the mutual contact is prevented by such arrangements as shown in (1) and (2) of FIG. 1(b).

FIGS. 2(a) and (b) show a state wherein filaments F are extended between electrodes A and between electrodes B perpendicular to the electrodes A.

In this case, either a combination of (1) and (4) and a combination of (2) and (3) or a combination of (1) and (2) and a combination (3) and (4) may be used.

According to the present invention, the resistivity of the silicon carbide filaments is specified and/or the composition of the filaments is specified. In addition, the filaments are arranged in a noncontact state. Therefore, the thermal time constant of the infrared detective element can be increased.

BRIEF DESCRIPTION OF THE DRAWINGS:

FIGS. 1(a) to 2(b) are diagrammatic views showing arrangements of silicon carbide filaments according to the present invention.

DETAILED DESCRIPTION OF THE PREFERRED EMBODIMENTS:

Examples 1 & 2 and Comparative Examples 1 & 2

Polycarbosilane was melt-extruded at different elongations to obtain filaments having two different diameters. These filaments were infusibilized in air at 200° C. for 60 minutes and then fired in an inert gas atmosphere at 1,000 to 1,400° C. for 30 to 60 minutes to obtain four silicon carbide monofilaments (composition: 54.5 wt% of Si; 27.2 wt% of C; 17.9 wt% of O; and 0.4 wt% of H) having the characteristics shown in Table 1.

These monofilaments were each cut into pieces each having a length of 20 mm. 100 pieces of each group were arranged parallel to each other without bringing them into contact, and a DC voltage of 8 V was applied thereto. An output and a voltage waveform generated upon shielding of heat rays, radiated from a blackbody furnace as a heat source, by a high-speed shutter were measured by an oscilloscope, thereby measuring a thermal time constant. The results are as shown in the following Table 1.

TABLE 1

| | Filament Diameter [μm] | Resistivity (room temperature) [Ω · cm] | Thermal Time Constant [msec] |
|---|---|---|---|
| Example 1 | 15 | $6.2 \times 10^4$ | 28 |
| Example 2 | 30 | $3.4 \times 10^3$ | 34 |
| Comparative Example 1 | 15 | $2.8 \times 10^6$ | Infusibible to detect |
| Comparative Example 2 | 30 | $4.5 \times 10^2$ | 362 |

Examples 3-7 and Comparative Examples 3 & 4

20 wt% of petroleum pitch was added to polycarbosilane, and the resultant mixture was heated at 300° C. to obtain an organosilicon polymer compound having polycarbosilane as a major constituent. The organosilicon polymer compound was melt-extruded at different elongations to obtain filaments having three different diameters. These filaments were infusibilized in air at 200° C. for 60 minutes and then fired in an inert gas at 1,200 to 1,600° C. for 30 t 60 minutes to obtain seven types of silicon carbide filaments (composition: 57.6 wt% of Si; 33.1 wt% of C; 8.8 wt% of O; and 0.5 wt% of H) whose characteristics are shown in Table 2.

Thermal time constants of these samples were measured following the same procedures as in Example 1. The results are shown in Table 2 below.

TABLE 2

| | Filament Diameter [μm] | Resistivity (room temperature) [Ω · cm] | Thermal Time Constant [msec] |
|---|---|---|---|
| Example 3 | 8 | $8.2 \times 10^2$ | 44 |
| Example 4 | 8 | $2.5 \times 10^1$ | 40 |
| Example 5 | 15 | $1.8 \times 10^3$ | 38 |
| Example 6 | 15 | $5.5 \times 10^{-1}$ | 48 |
| Example 7 | 30 | $4.8 \times 10^1$ | 50 |
| Comparative Example 3 | 15 | $6.2 \times 10^{-2}$ | 320 |
| Comparative Example 4 | 30 | $3.8 \times 10^6$ | Impossible to detect |

Comparative Example 5

250 fiber filaments obtained in Example 3 were bundled and partially brought into contact to measure a thermal time constant. The thermal time constant was 295 msec.

According to the above results, the samples of the Examples of the present invention have remarkably low thermal time constants, that is, remarkably high response speed, as compared with those of the Comparative Examples.

As is apparent from the above description and the Examples, the infrared detective elements of the present invention have excellent characteristics and especially short response times. These characteristics can be obtained in a variety of applications, thus providing good industrial advantages.

What is claimed is:

1. An infrared detective element for detecting a dose of infrared rays by a change in electrical resistance of monofilaments composed mainly of silicon carbide upon infrared radiation thereto, the monofilaments having a resistivity of $1.0 \times 10^5$ to $1.0 \times 10^3$ Ω.cm at room temperature and a diameter of 3 to 200 μm, the monofilaments being arranged between electrodes without bringing them into contact with each other.

2. An infrared detective element for detecting a dose of infrared rays by a change in electrical resistance of monofilaments composed mainly of silicon carbide upon infrared radiation thereto, the monofilaments having a composition:
   Si 50 to 70 wt%
   C 28 to 40 wt%
   O: 0 to 10 wt%
   the balance (H and/or Ti or Zr): 0 to 10 wt%, and having a resistivity of $1.0 \times 10^5$ to $1.0 \times 10^{-1}$ Ω.cm at room temperature and a diameter of 3 to 200 μm, the monofilaments being arranged between electrodes without bringing them into contact with each other.

* * * * *